United States Patent
Atta et al.

(10) Patent No.: US 10,202,548 B1
(45) Date of Patent: Feb. 12, 2019

(54) MODIFICATION OF SAND WITH SUPERHYDROPHOBIC SILICA/WAX NANOPARTICLES

(71) Applicant: KING SAUD UNIVERSITY, Riyadh (SA)

(72) Inventors: Ayman M. Atta, Cairo (EG); Mahmood M. S. Abdullah, Taiz (YE); Hamad A. Al-Lohedan, Riyadh (SA); Abdelrahman O. Ezzat, Mansoura (EG); Mohamed Hasan Wahby, Alexandria (EG)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 15/945,680

(22) Filed: Apr. 4, 2018

(51) Int. Cl.
| | |
|---|---|
| *A01G 7/00* | (2006.01) |
| *C09K 17/42* | (2006.01) |
| *C09D 5/16* | (2006.01) |
| *C09D 191/06* | (2006.01) |
| *E02D 3/00* | (2006.01) |
| *A01G 24/10* | (2018.01) |
| *A01G 24/30* | (2018.01) |
| *A01G 24/60* | (2018.01) |

(52) U.S. Cl.
CPC ............. *C09K 17/42* (2013.01); *A01G 7/00* (2013.01); *A01G 24/10* (2018.02); *A01G 24/30* (2018.02); *A01G 24/60* (2018.02); *C09D 5/1681* (2013.01); *C09D 191/06* (2013.01); *E02D 3/00* (2013.01)

(58) Field of Classification Search
CPC ........................................... A01G 7/00
USPC ........................ 47/58.1 R, 58.1 SC
See application file for complete search history.

(56) References Cited

U.S. PATENT DOCUMENTS

| | | | |
|---|---|---|---|
| 3,108,441 A | 10/1963 | Watson | |
| 5,348,621 A * | 9/1994 | Rudy | C08B 15/02 |
| | | | 162/100 |
| 5,961,389 A * | 10/1999 | Dickinson | C09K 17/40 |
| | | | 106/272 |

(Continued)

FOREIGN PATENT DOCUMENTS

CN    106866010 A    6/2017

OTHER PUBLICATIONS

Xuehu Men et al., "Facile fabrication of superhydrophobic sand: Potential advantages for practical application in oil-water separation", Journal of the Taiwan Institute of Chemical Engineers (2016), vol. 60, pp. 65'-655 (Abstract only).

(Continued)

*Primary Examiner* — David J Parsley
(74) *Attorney, Agent, or Firm* — Richard C. Litman

(57) ABSTRACT

The modification of sand with superhydrophobic silica/wax nanoparticles may provide for water storage, applicable, for example, in desert environments. In particular, highly thermal stable superhydrophobic coats for sand are made of nanoparticles composed of superhydrophobic silica capped with paraffin wax. Superhydrophobic sand modified by such nanoparticles addresses issues of water storage in desert environments, capitalizing on sand resource utilization. Superhydrophobic sand, as modified, has excellent water repellency and great water-holding capacity. The superhydrophobic sand modified with superhydrophobic silica/wax nanoparticles can be applied for the desert water storage for agriculture and planting.

10 Claims, 14 Drawing Sheets

(56) References Cited

U.S. PATENT DOCUMENTS

| | | | | |
|---|---|---|---|---|
| 6,235,070 B1 * | 5/2001 | Beermann | ............... | A61K 8/02 |
| | | | | 106/271 |
| 6,821,332 B2 * | 11/2004 | Hubbs | ................... | C09K 17/40 |
| | | | | 106/270 |
| 7,160,379 B1 | 1/2007 | Shoshany et al. | | |
| 8,034,429 B2 * | 10/2011 | Huff | ...................... | E01C 13/08 |
| | | | | 428/87 |
| 2003/0106259 A1 | 6/2003 | Petrea et al. | | |

OTHER PUBLICATIONS

Liwei Chen et al., "Superhydrophobic Sand: A Hope for Desert Water Storage and Transportation Project", J.Mater. Chem. A (2017), 9 pages with Supplementary Materials (9 pages).
"Magic Sand", Wikipedia (2018), 1 page.

* cited by examiner

US 10,202,548 B1

MODIFICATION OF SAND WITH SUPERHYDROPHOBIC SILICA/WAX NANOPARTICLES

BACKGROUND

1. Field

The disclosure of the present patent application relates to the field of water storage, and particularly to a modification of sand with superhydrophobic silica/wax nanoparticles, more particularly for desert water storage.

2. Description of the Related Art

Sand is an abundant natural resource in desert environments and has strong hydrophilicity and quickly absorbs water, affecting desert greening and water storage. With the development of superhydrophobic materials, the potential of "superhydrophobic sand" may provide an opportunity to realize storage and transportation of surface water and address issues of resource utilization and relevant environmental problems in desert environments. Potential means for maintaining and flowing water on a sand surface are of great significance in both practical applications and fundamental research studies, but are not widely achieved.

Superhydrophobic sand could capitalize on a plentiful resource to address existing environmental and water supply problems. However, existing efforts at producing superhydrophobic sand, such as forming hydrophobic film on sand by spraying, have proven unstable and ineffective at least in the event that the sand moves.

Thus, a modification of sand with superhydrophobic silica/wax nanoparticles for desert water storage solving the aforementioned problems is desired.

SUMMARY

The modification of sand with superhydrophobic silica/wax nanoparticles is a process in which silica nanoparticles are prepared with hydrophobic silane derivatives that are coated with paraffinic wax and applied to sand to produce superhydrophobic sand. Wax with high thermal stability and good adhesion to sand surfaces was obtained to prepare superhydrophobic sand. Compared with raw sand, the superhydrophobic sand can keep water droplets staying with almost perfect spheres and flowing on it. With the purpose of sand resource utilization for desert water storage and transportation, the sand modified with superhydrophobic silica/wax nanoparticles provides for producing modified desert sand with significant improvements in several properties, including water-holding capacity, thermal stability and anti-flow-resistance.

A method of forming superhydrophobic silica/wax nanoparticles may comprise a step of mixing tetraethyl orthosilicate (TEOS), a fatty amide of γ-aminopropyltriethoxysilane (SFA), a fatty amine of vinyltrimethoxysilane (SOA), and a wax emulsion. The wax emulsion may be dissolved in water prior to mixing, and the TEOS, SFA and SOA may be dissolved in a nonpolar solvent. The superhydrophobic silica/wax nanoparticles formed by such a method, treated sand coated by said particles, methods of coating sand with the nanoparticles, and sand mixtures comprising such treated sand are described herein.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
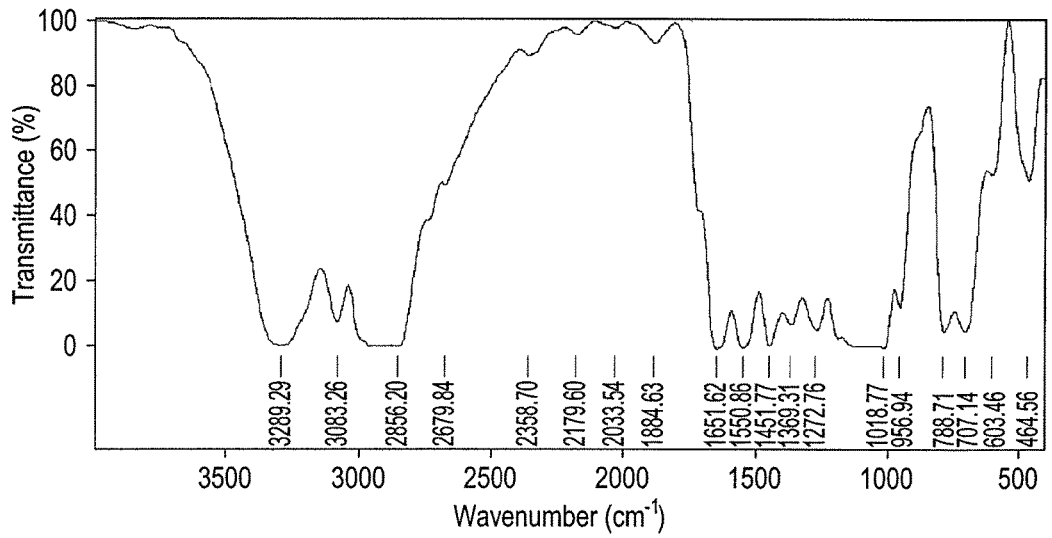
FIG. 1A is the FTIR spectrum of SOA (silane alkoxy amide fatty acids).

The modification of sand with superhydrophobic silica/wax nanoparticles may be achieved by coating raw sand with such nanoparticles having modified thermal, adhesive and mechanical properties, thereby producing superhydrophobic sand. Additionally, a low ratio of the superhydrophobic sand, produced as disclosed herein, mixed with normal sand increases the water storage capacity of such mixed sand relative to raw sand. Thus, a small amount of superhydrophobic sand allows, for instance, greater potential for planting and agricultural pursuits in desert environments. To this end, new hydrophobic modified silica nanoparticles capped with wax, and methods of producing such nanoparticles, are provided, as are methods of using such nanoparticles to coat sand. Exemplary methods of producing such nanoparticles and applying the nanoparticles to raw sand are provided below. The methods of coating sand disclosed herein take advantage of the adhesive properties of sand with the siloxy groups of the nanoparticles.

In the following discussion, the superhydrophobic silica nanoparticles coated with wax will alternately be referred to as the superhydrophobic silica/wax nanoparticles, the nanoparticles, the hydrophobic silica nanoparticles capped with wax, referring to the nanoparticles described herein.

In the methods described herein, hydrophobic modified silicone precursors were used, including a precursor based on amidation of γ-aminopropyltriethoxysilane combined with saturated and unsaturated fatty acids (SOA) were prepared. Oleic acid was selected as a representative sample fatty acid. Additionally, saturated and unsaturated fatty amines are proposed to modify the hydrophobic characteristic of vinyltrimethoxysilane combined with fatty acids to obtain fatty amines of vinyltrimethoxysilane (SFA).

In the following examples, all materials were analytical grade and purchased from Sigma-Aldrich Chemicals Co. Silicone precursors based on vinyl trimethoxysilane (VTS), tetraethoxysilane (TEOS), and γ-aminopropyltriethoxysilane (APS) were used. Several types of saturated fatty acids—such as stearic, hexadecanoic and tetradecanoic acids—and amines were used to prepare hydrophobic silicones. Unsaturated fatty acids—such as oleic, linoleic and linolenic acids—and amines were also used to prepare hydrophobic silicone precursors. The present subject matter should be understood to not be limited by the previously listed saturated or unsaturated fatty acids. Hexadecyltrimethylammonium bromide (CTAB; also known as cetrimonium bromide and cetyltrimethylammonium bromide) was used as a cationic surfactant to prepare wax emulsions, but wax emulsions prepared by another method may also be used. The paraffin wax (extracted from Arabic heavy crude oil) comprising the wax emulsions used in the following Examples had a very narrow range of melting temperature from 51° C. to 54° C. The paraffin wax comprised mainly normal alkenes with 28-38 carbon atoms.

A wax emulsion was prepared from a mixture of paraffin wax and CTAB by slowly adding water with gentle agitation provided by a magnetic stirrer. The addition rate of water was kept constant at approximately 1.0 mL/min. The emulsification was performed at temperatures in a range of 50° C. to 80° C., as needed, but need not be limited thereto. The concentration of paraffin wax in the wax emulsion was kept constant at 20.0 wt. %, while the CTAB surfactant concentration was varied from 3.0 to 8.0 wt. %. The concentrations are not meant to be limiting.

Example 1

Preparation of Fatty Amides of
γ-Aminopropyltriethoxysilane (SOA)

Carboxyl groups of a fatty acid—the fatty acid being selected from saturated or unsaturated fatty acids, such as stearic and oleic acids, respectively, as non-limiting examples—were reacted with an amine group of γ-aminopropyltriethoxysilane (APS) to produce a silane alkoxy amide fatty acid (SOA). In a reaction vessel, the fatty acid (1 mol, for example) was mixed with a stoichiometric amount of APS at 180° C. for 2 h in a nitrogen atmosphere. After reaction, the mixture was cooled to room temperature and stored in a desiccator. SOA was also prepared at lower temperatures as follows. Equimolar amounts of fatty acid and APS were evenly dispersed in an ethanol solution (ethanol/water=9:1) and stirred at room temperature for 1.5 h.

Example 2

Preparation of Fatty Amines of
Vinyltrimethoxysilane (SFA)

A fatty amine, such as oleyl amine (0.01 mol), was added to vinyltrimethoxysilane (0.05 mol) in 80 ml tetrahydrofuran (THF) while stirring at 65° C. for 4 h. The THF was removed with a rotary evaporator under pressure to obtain fatty amines of vinyltrimethoxysilane (SFA).

Example 3

Preparation of Silica-Coated
Nanoparticles—Method 1

Methanol (100 mL) was placed in a sonication bath. After 10 min, a known volume of TEOS (for example, 0.8 mL), SFA (0.4 g) and SOA (0.4 g) was added while sonicating. After 20 min, 28% ammonium hydroxide (24 mL) was added as a catalyst to promote a condensation reaction. Sonication continued for a further 60 min to achieve a white turbid suspension. All the above steps were conducted at room temperature.

Example 4

Preparation of Silica-Coated
Nanoparticles—Method 2

Methanol (100 mL) and wax emulsion (2 g) were combined and placed in a sonication bath. After 10 min, a known volume of TEOS (0.8 mL), SFA (0.4 g) and SOA (0.4 g) were added while sonicating. After 20 min, ammonium hydroxide (24 mL; 28 wt. %) was added as a catalyst to promote a condensation reaction. Sonication continued for a further 60 min to achieve a white turbid suspension. All the above steps were conducted at room temperature.

Example 5

Preparation of Silica-Coated
Nanoparticles—Method 3

Wax emulsion (2 g) was dissolved in 100 mL of deionized water under stirring. Next, concentrated ammonia in water (7.0 mL; 28 wt. %) was added, resulting in a clear solution. A mixture solution of n-hexane (20 mL), TEOS (3 mL), SFA (1 mL) and SOA (1 mL) was added into the solution in a dropwise manner over 30 min, under continuous stirring. The reaction proceeded at 35° C., resulting in gradual formation of a homogeneous, milky, colloidal solution under continuous stirring (200 rpm).

Example 6

Preparation of Silica-Coated
Nanoparticles—Method 4

Wax emulsion (2 g) was mixed with water (100 mL) and stirred vigorously for 1 h with a magnetic stirrer. TEOS (2 g), SFA (1 mL) and SOA (1 mL) were added, and stirring continued for an additional 30 minutes. Various amounts of chloroform (0.5-1.5 mL) were added until an emulsion was achieved during stirring for a further 4 h. APTES (0.54 g in 1.5 mL of water) was added to the reaction mixture. The solution was aged overnight to obtain silica coated wax nanoparticles.

Example 7

Preparation of Silica-Coated
Nanoparticles—Method 5

TEOS (2 g), SFA (1 mL) and SOA (1 mL) were added to a hydrochloric acid solution (30 g, pH 0.5) at room temperature. Wax emulsion (2 g) was added while stirring to obtain a clear solution. A white gel solution was obtained by adding 3.0 g of 14.7 M ammonia water and stirring for 24 h. An increase in stirring time showed a tendency for decreased final grain size. The gel was aged at room temperature for 24 h and then dried at 60° C. in air for 24 h.

Fourier transform infrared (FTIR; Shimadzu FTIR 8000 spectrometer using KBr disc) spectrometry was used to confirm the formation of the SFA and SOA precursors. Proton nuclear magnetic resonance ($^1$HNMR; 400 MHz Bruker Avance DRX-400 spectrometer) spectroscopy was used to investigate the chemical structure of SFA and SOA in deuterated dimethyl sulfoxide (DMSO) solvent. Thermogravimetric analysis (TGA; NETZSCH STA 449 C instrument) was used to determine the thermal stability and contents of silica nanoparticles. Samples were heated at a rate of 283 K·min$^{-1}$ under a dynamic nitrogen flow of 45 mL·min$^{-1}$.

Transmission Electron Microscopy (TEM; JEOL JEM-2100 F instrument) was used to investigate the morphology of the silica nanoparticles. TEM was performed at an acceleration voltage of 200 kV in the results presented herein. A drop shape analyzer (DSA-100) was used to determine the contact angles of glass coated with hydrophobic silica nanoparticles using sessile drop method at room temperature. Dynamic light scattering (DLS; Zetasizer Nano ZS, Malvern Instrument Ltd., Malvern, UK) was used to determine the hydrodynamic diameter ($H_d$) and polydispersity index (PDI) of the silica nanoparticles in n-hexane solutions at 25° C. produced by methods 1-5. Zeta potentials were determined in methanol dispersions. Results are described below.

Example 8

Method of Forming and Assessing Superhydrophobic Sand

To achieve superhydrophobic sand for the following tests and assays, 5 g of sand was modified with 50 ml of 0.5% hydrophobic silica prepared by each of methods 1-5. Each solution of sand and hydrophobic silica was subject to continual stirring for 3 h at room temperature. Each treated sand product was collected after rinsing with ethanol three times and drying at 60° C. for 1 h.

The superhydrophobic sand was mixed with untreated sand at ratios ranging from 1:1 to 1:10 wt % to form mixed sand. 10 mL of water was added to 2 g of the mixed sand at the previous ratios, and the time for water to pass from sand into a glass column was determined.

Example 9

Results of Exemplary Methods and Characterization Assays

Figure 1B:
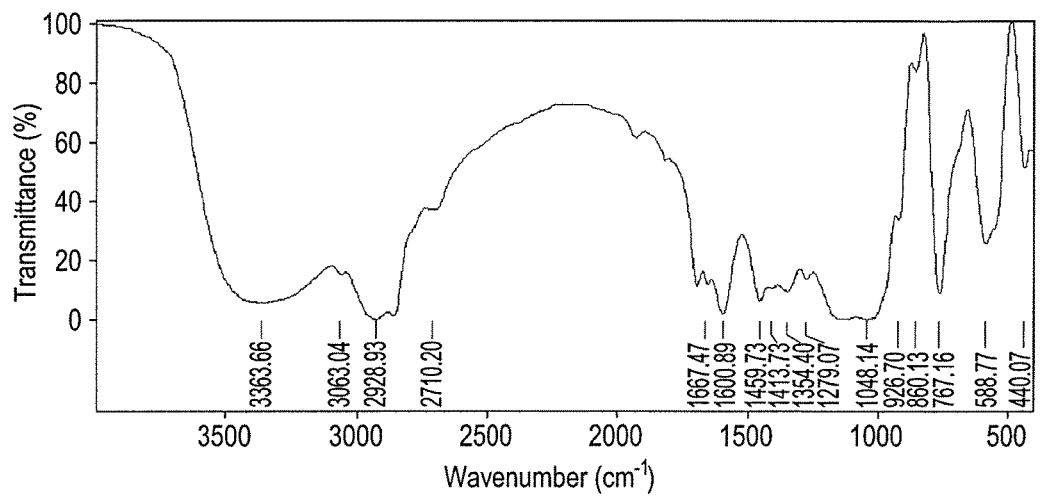
FIG. 1B is the FTIR spectrum of SFA (fatty amines of vinyltrimethoxysilane).
Figure 2A:
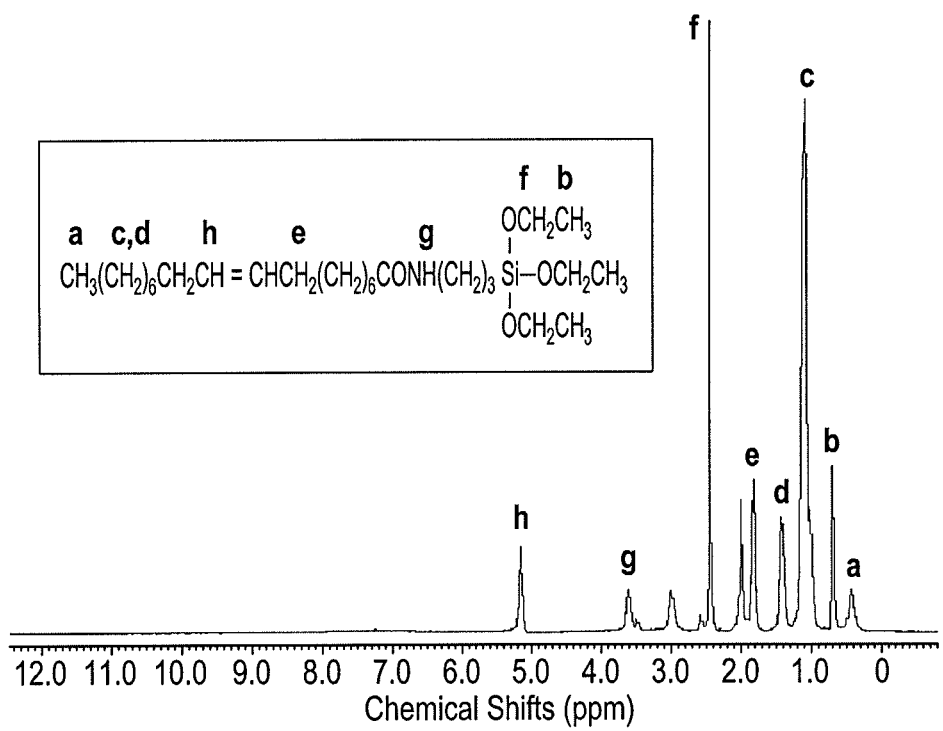
FIG. 2A is the $^1$HNMR spectrum of SFA (fatty amines of vinyltrimethoxysilane).
Figure 2B:
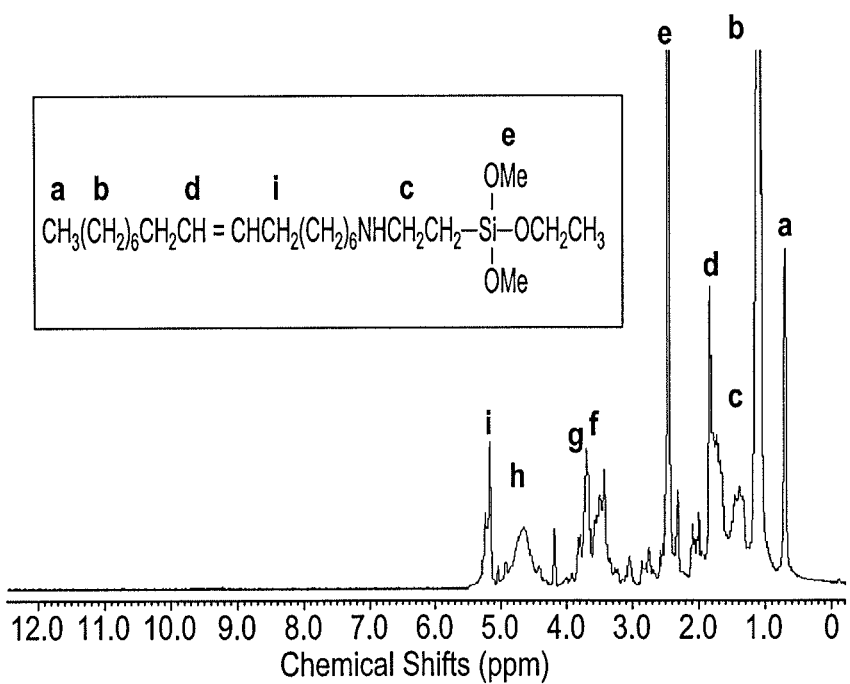
FIG. 2B is the $^1$HNMR spectrum of SOA (silane alkoxy amide fatty acids).

The chemical structures of SOA and SFA were confirmed by FTIR and $^1$HNMR spectra, the results of which are depicted in FIGS. 1A-1B and 2A-2B. The proposed chemical structures of SOA and SFA are identified as represented in FIGS. 2A and 2B, respectively. The formation of an amide group in SOA is elucidated from the appearance of strong bands in its FTIR spectrum, FIG. 1A, at 3289 cm$^{-1}$, 1651 cm$^{-1}$ and 1550 cm$^{-1}$, which are attributed to NH stretching, CONH stretching, and NH bending, respectively. The disappearance of broad bands of COOH groups at 3500 cm$^{-1}$ and 1700 cm$^{-1}$, characteristic of OA (oleic acid), elucidates the amidation of OA with γ-aminopropyltriethoxysilane in SOA. The presence of bands at 3083 and 780 cm$^{-1}$ that relate to olefinic CH stretching and C=C bending, respectively, in OA elucidates the presence of the unsaturated double bond of OA, without saturation or distortion during the amidation reaction at high and low reaction temperature. The presence of the unsaturated double bond of OA is also confirmed from the $^1$HNMR spectrum of SOA, shown in FIG. 2A, which evinces a peak at 5.16 ppm. The disappearance of the peak at 12.3 ppm and appearance of a peak at 3.62 ppm, related to CONH, confirms the amidation of OA in forming SOA.

Saturation of the vinyl group of vinyltriethoxysilane with a fatty amine, such as oleyl amine, to form SFA by an addition reaction is elucidated from the FTIR spectrum, shown in FIG. 1B. Specifically, the appearance of one band at 3500 cm$^{-1}$ is related to NH stretching of the secondary amine produced by the addition reaction of the oleyl amine to the vinyl group of vinyltriethoxysilane. The disappearance of the peak at 5.6 ppm related to the vinyl group and appearance of new two peaks at 3.8 ppm and a broad peak at 4.2 ppm, related to $CH_2$—N and NH, respectively (shown in FIG. 2B), elucidates the formation of SFA from the FA.

Figure 3:
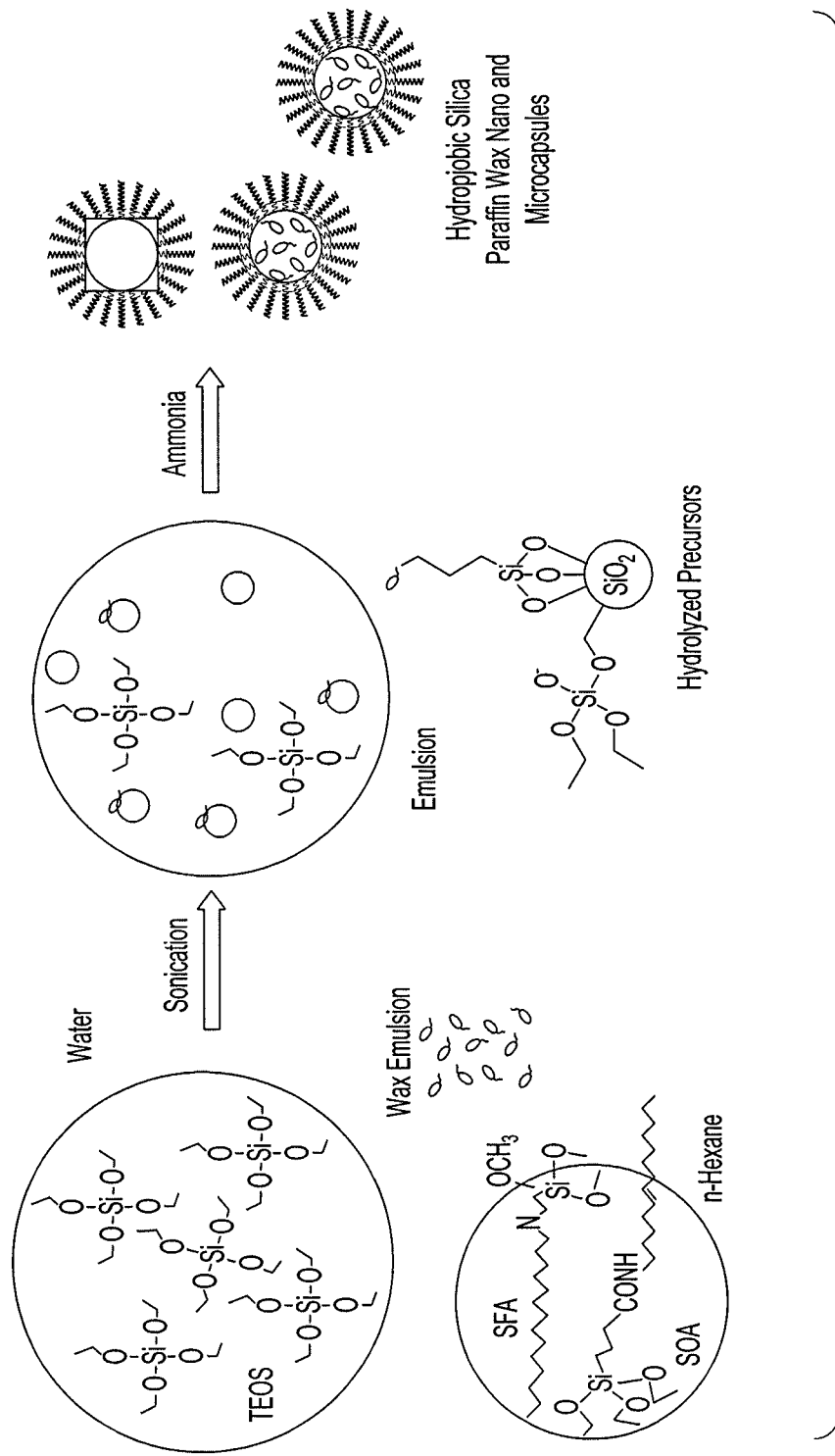
FIG. 3 is a schematic representation of a method of synthesis of the hydrophobic silica nanoparticles capped with wax and the resulting nanoparticles, specifically according to method 3, as described herein.
Figure 4A:
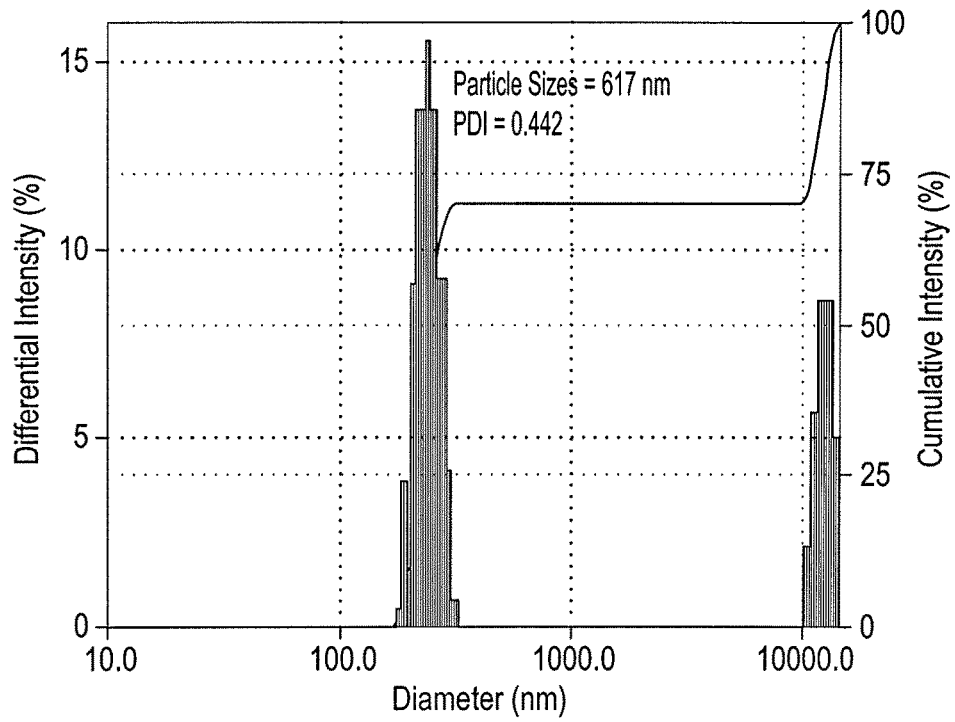
FIGS. 4A, 4B, 4C, 4D, and 4E are charts showing the results of DLS (dynamic light scattering) testing of hydrophobic silica nanoparticles, bare and capped with wax, in n-hexane prepared according to Method 1, Method 2, Method 3, Method 4, and Method 5, respectively.
Figure 4B:
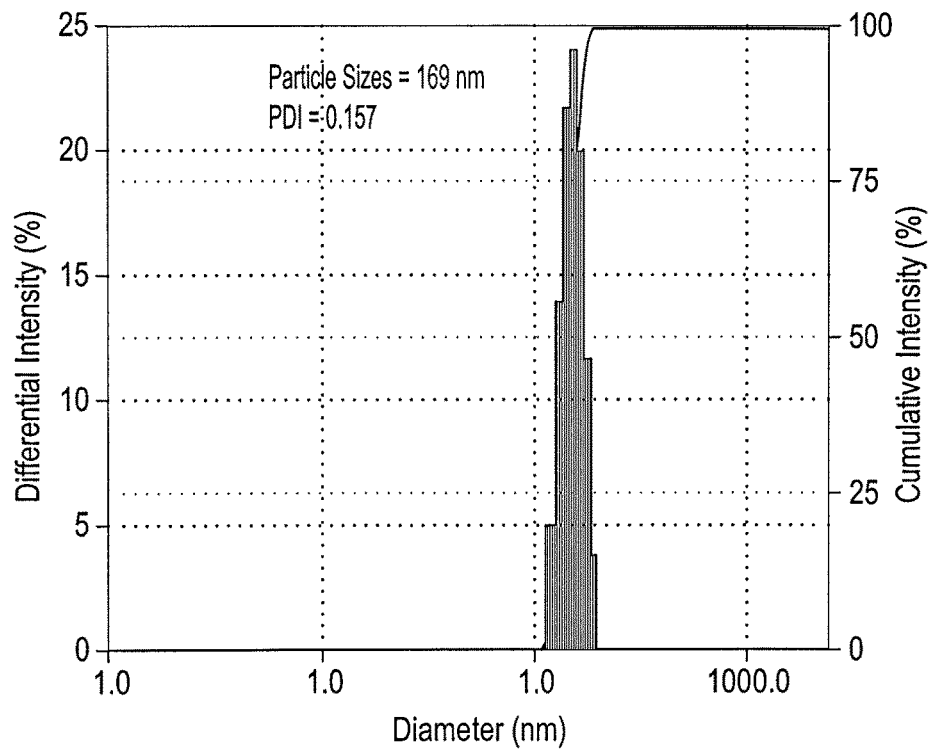
Figure 4C:
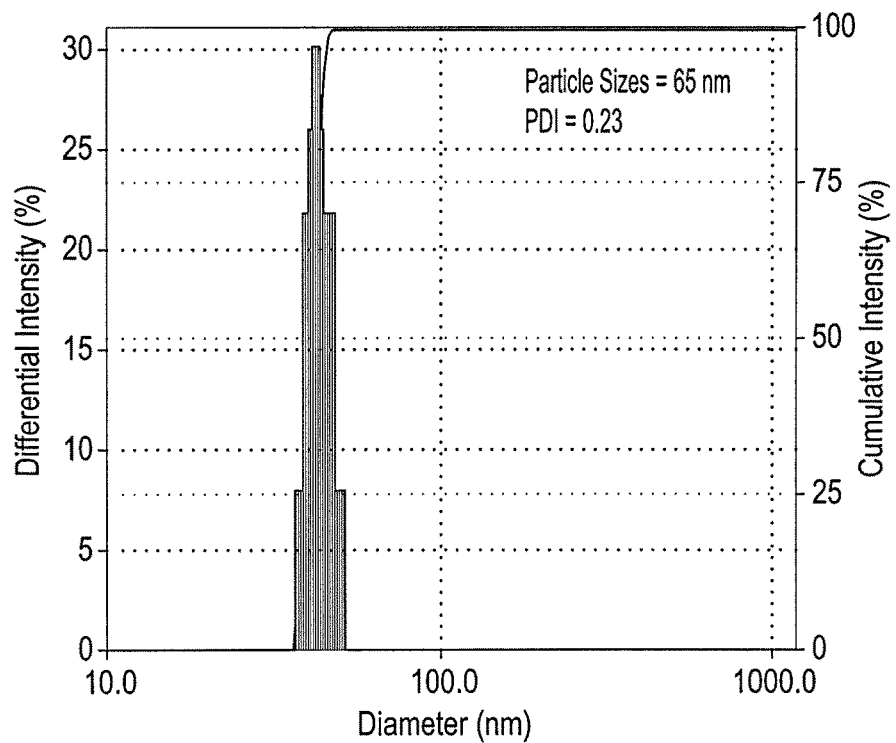
Figure 4D:
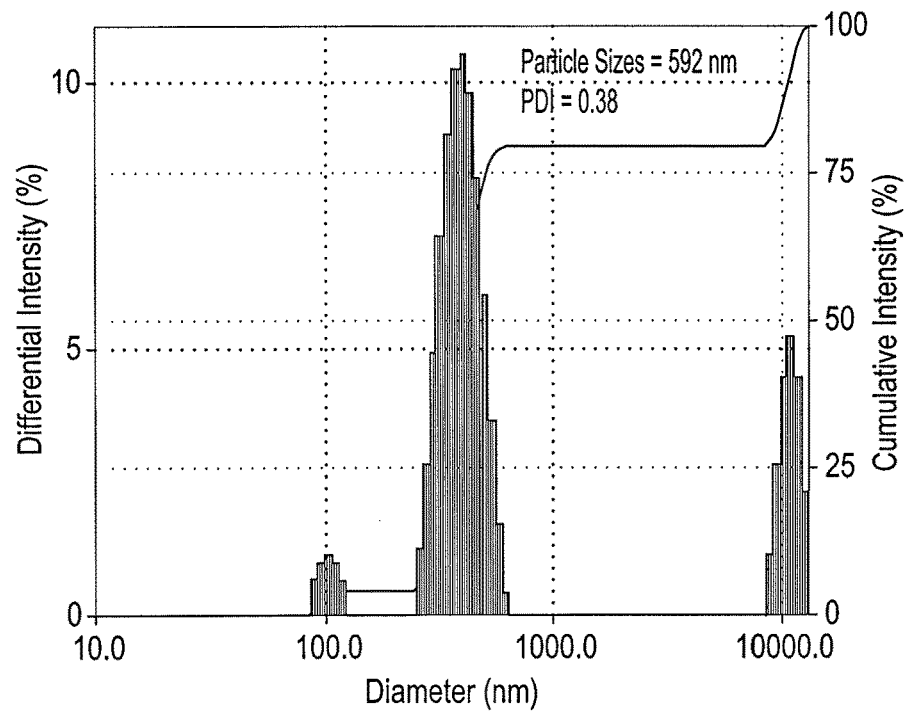
Figure 4E:
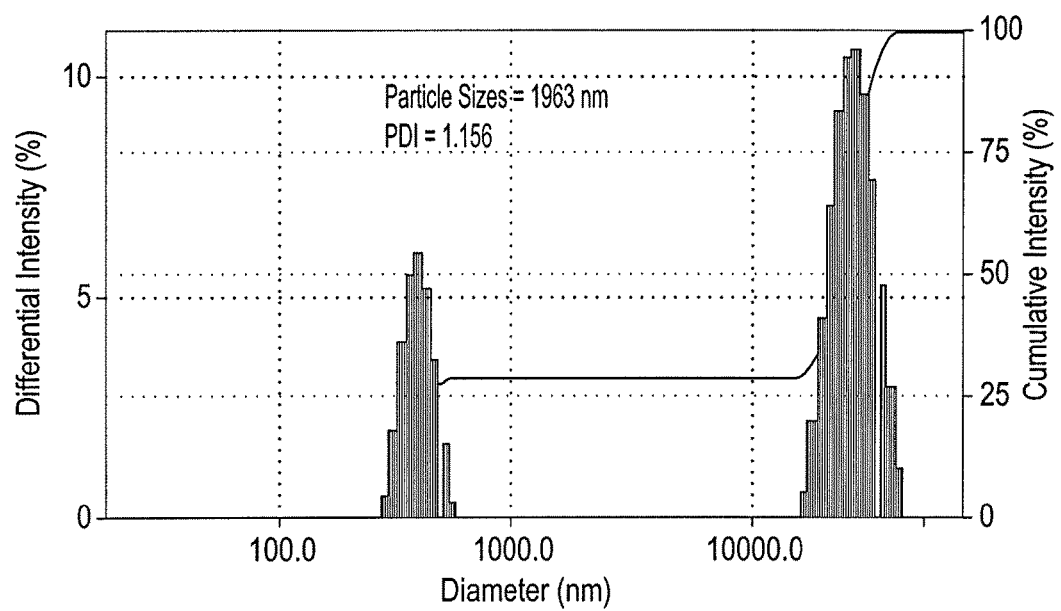
Figure 5A:
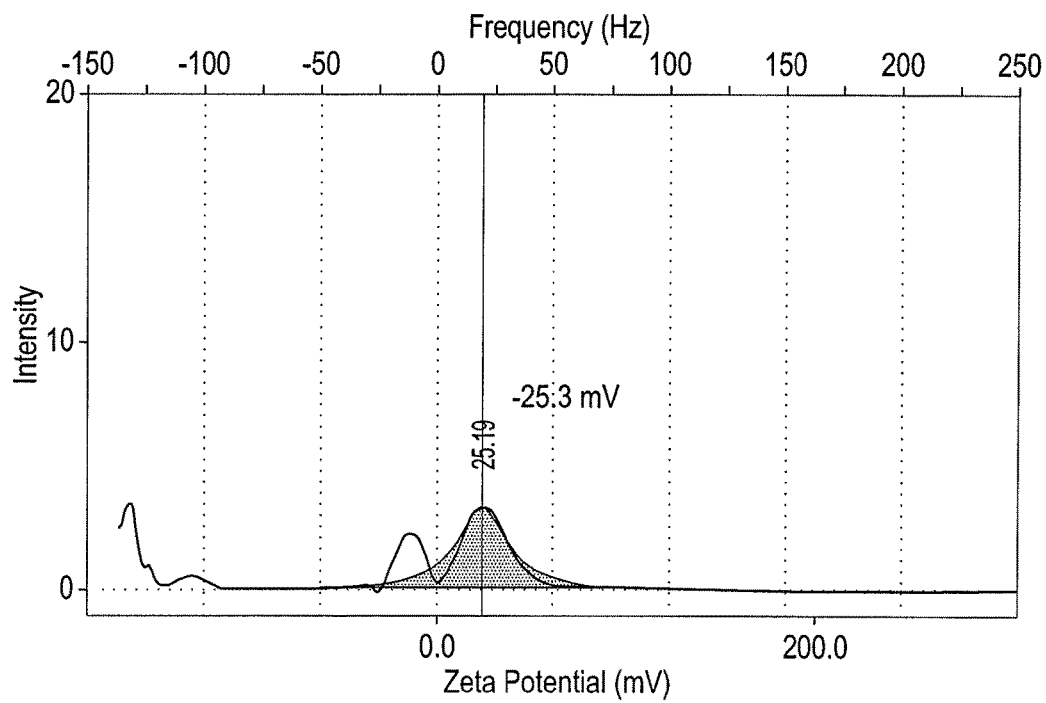
FIGS. 5A, 5B, 5C, 5D, and 5E are plots of the Zeta potential of hydrophobic silica nanoparticles, bare and capped with wax, in methanol prepared by Method 1, Method 2, Method 3, Method 4, and Method 5, respectively.
Figure 5B:
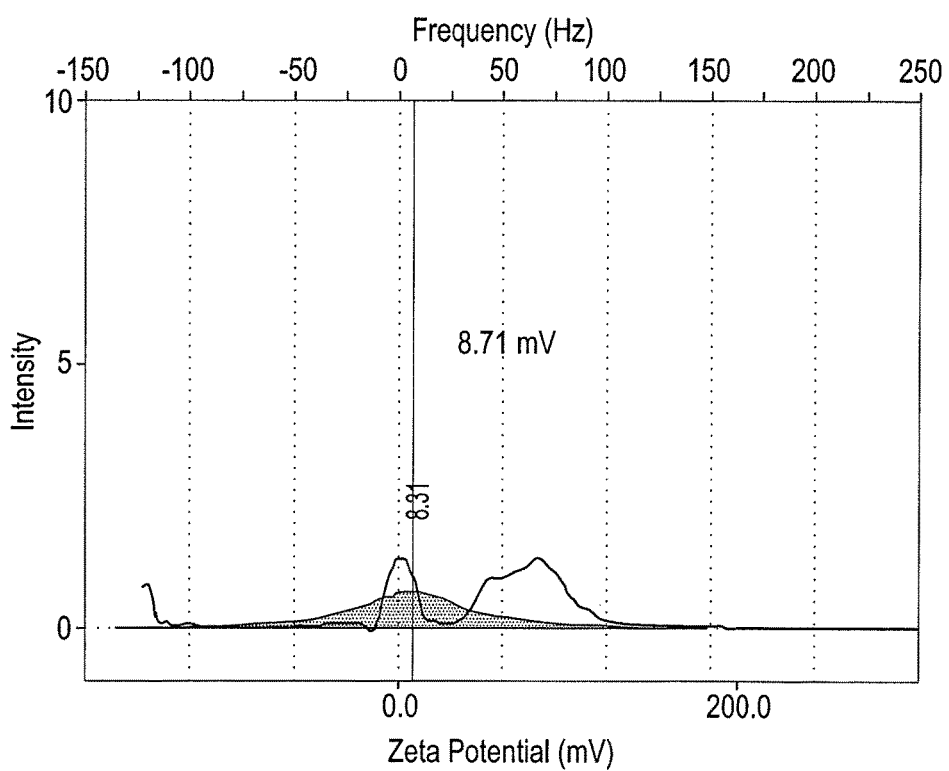
Figure 5C:
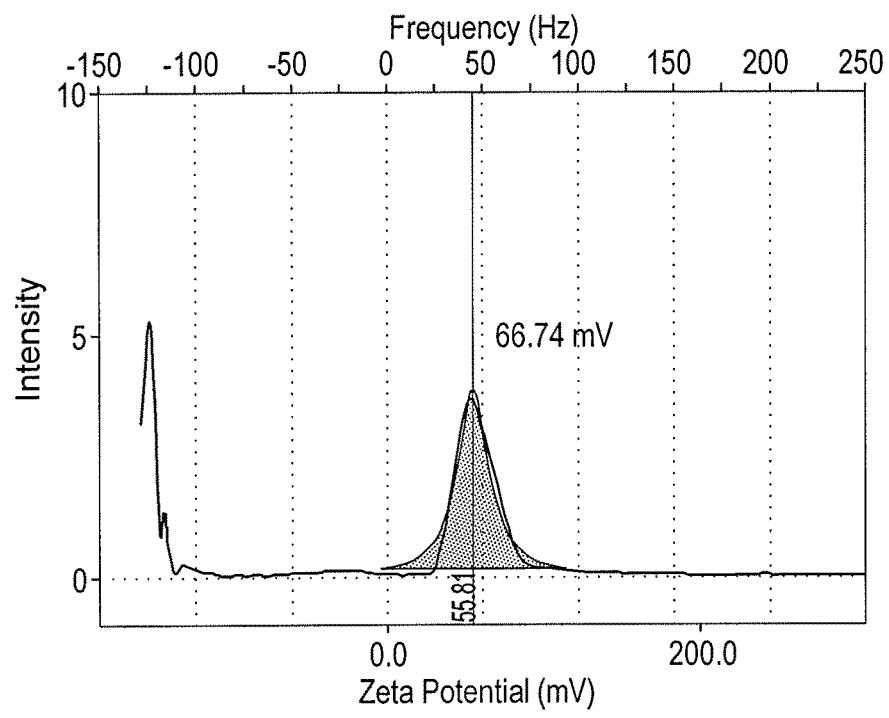
Figure 5D:
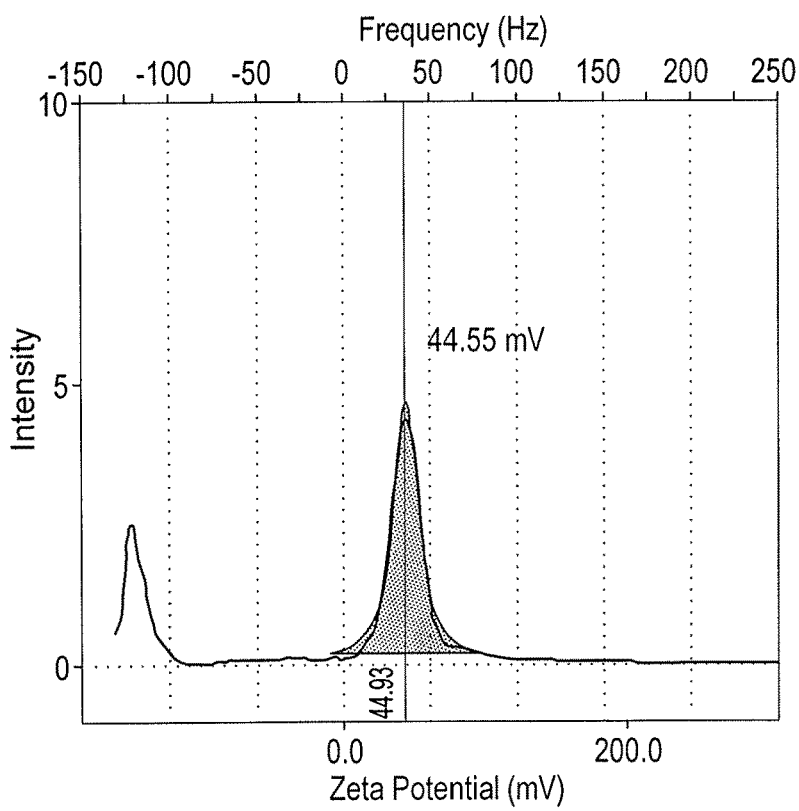
Figure 5E:
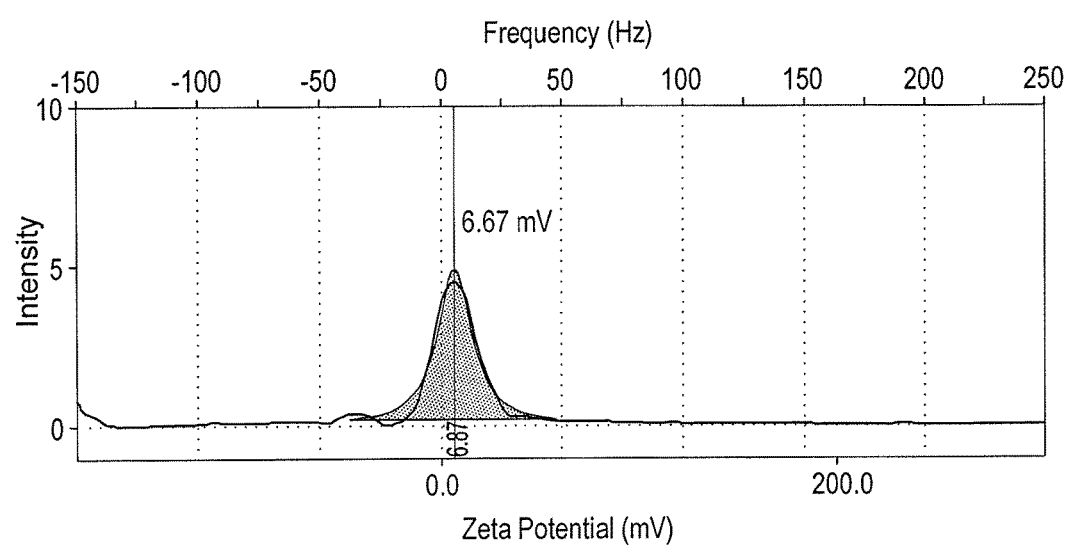

The formation and capping of silica nanoparticles with paraffin wax by hydrolyzing the alkoxy groups of SFA, SOA and TEOS in alkaline solutions according to method 3 is shown schematically in FIG. 3.

Methods 1 and 2 provide hydrophobic silica nanoparticles formed in the absence and presence, respectively, of paraffin wax in a methanol solvent. Methods 3 and 4 produce hydrophobic silica nanoparticles capped with paraffin wax using a water/hexane wax emulsion or a water/chloroform wax emulsion, respectively. Method 5 produces hydrophobic silica nanoparticles capped with wax in water in the presence of both HCl and ammonia solutions. Experiments have been performed varying the wax contents relative to silica precursors from 5 wt. % to 50 wt. % in methods 2 and 5.

Particle sizes and surface charges of hydrophobic silica nanoparticles capped with wax were determined from DLS and Zeta potentials in heptane and ethanol, exemplary results being shown in FIGS. 4A-4E and 5A-5E, respectively, with the A-E suffixes corresponding to Methods 1-5. Sizes of the nanoparticle (nm) and polydispersity indexes (PDI) values are recorded in the FIGS. 4A-4E. Silica capped wax nanoparticles formed according to the present application may have monodisperse distribution and low particle sizes of 65 nm, as obtained in the hexane/water emulsion (Method 3), for example. Moreover, particle sizes of silica-capped nanoparticles were reduced in the presence of paraffin wax emulsion (Method 2) relative to those obtained in the absence of wax (Method 1). This observation is hypothesized to be due to increased hydrolysis of alkoxy groups of SOA and SFA in the presence of wax emulsion, possibly resulting from good compatibility between wax and the oleyl groups of SFA and SOA via van der Waals interaction. Compatibility between reactants reduces the sizes of nanoparticles, as shown schematically in FIG. 3. The surface charges of silica nanoparticles in the absence of wax (see, e.g., FIG. 5A; resulting from Method 1) are negative, consistent with the absence of wax during the synthesis of nanoparticles enhancing the appearance of hydroxyl groups on the surface of the silica nanoparticles, despite the presence of the oleyl group in the chemical structure of SFA and SOA. The presence of wax during preparation of hydrophobic silica nanoparticles in Methods 2-5 changes the surface charges of particles to positive FIGS. 5B-5E, due, presumably, to amine and amide groups of SFA and SOA, respectively, as well as to the presence of CTAB used in forming the wax emulsion.

Figure 6:
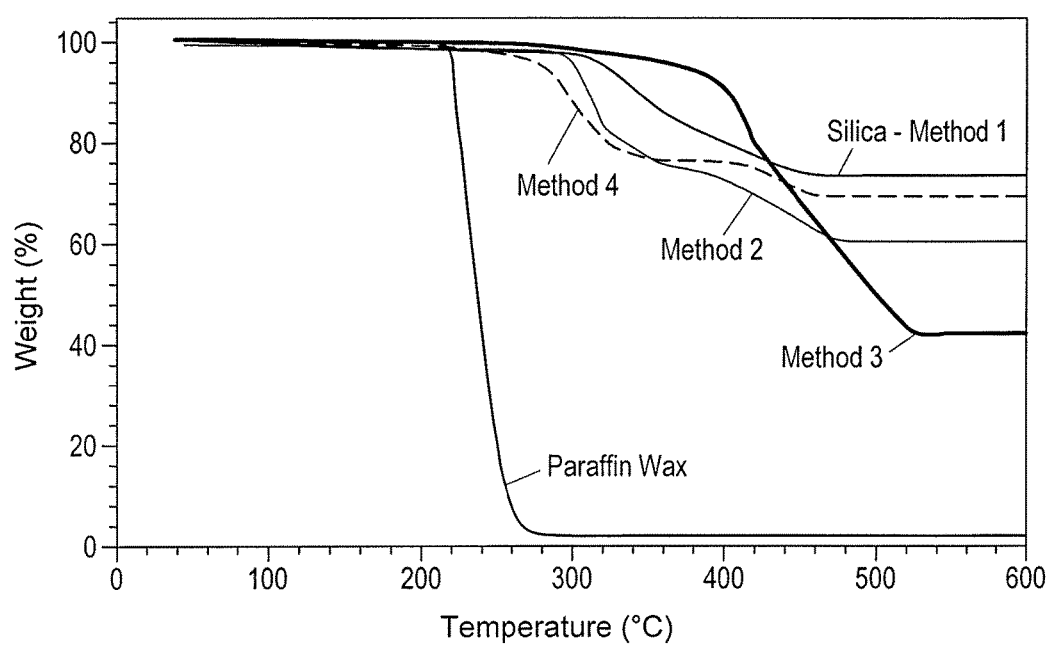
FIG. 6 is a plot of superimposed TGA thermograms of hydrophobic silica nanoparticles, bare and capped with wax, and prepared by Methods 1-4, as compared to pure silica and pure paraffin wax.
Figure 7A:
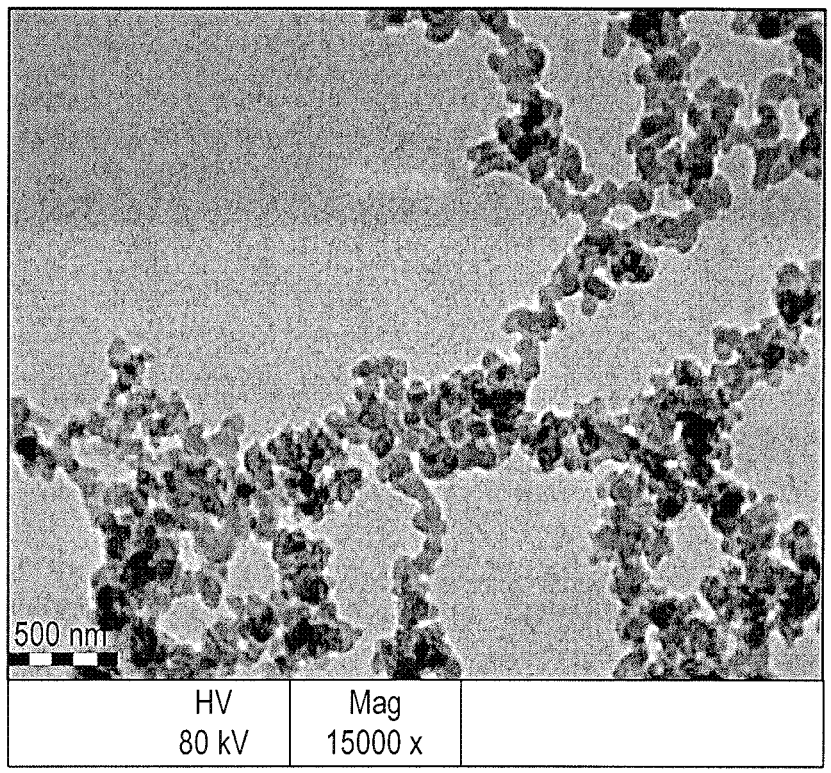
FIGS. 7A, 7B, 7C, 7D, and 7E are TEM micrographs of the hydrophobic silica nanoparticles, bare and capped with wax, in methanol prepared by Method 1, Method 2, Method 3, Method 4, and Method 5, respectively.
Figure 7B:
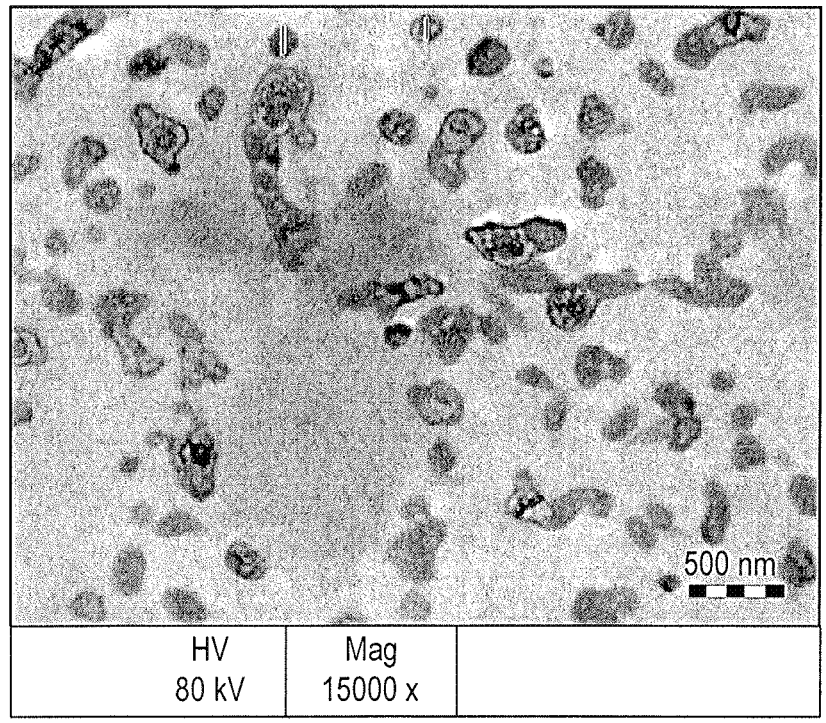
Figure 7C:
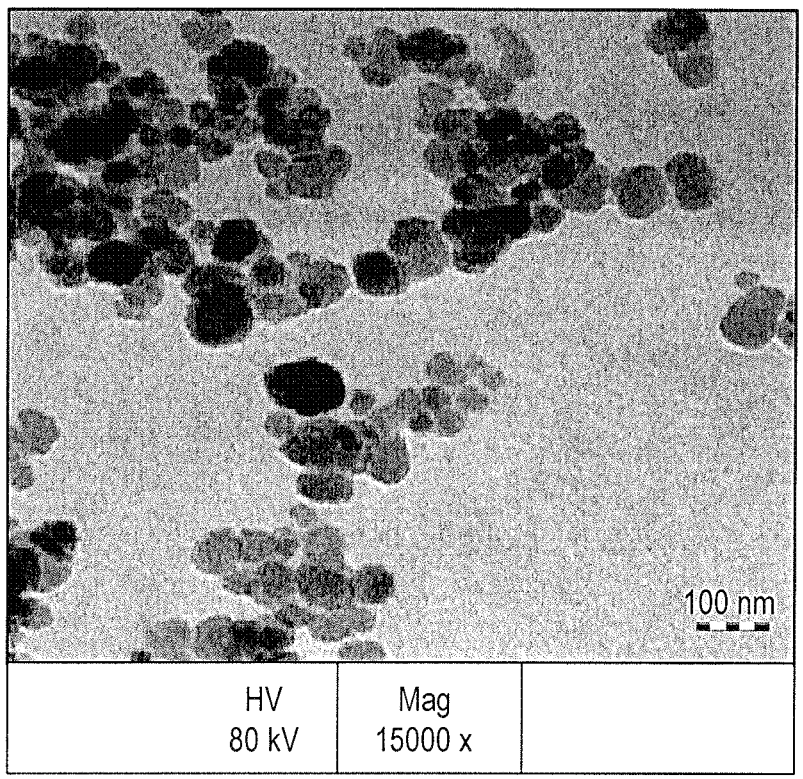
Figure 7D:
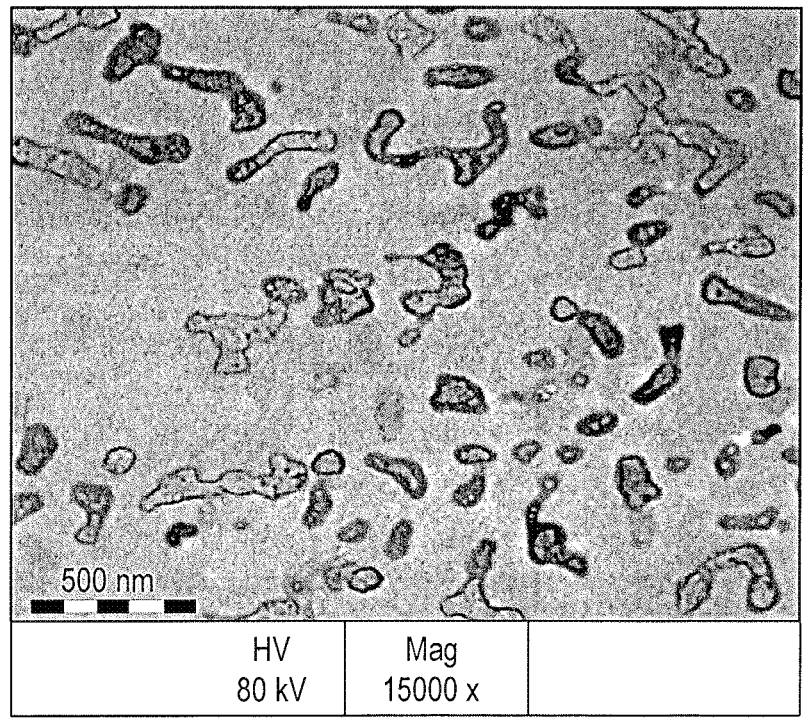
Figure 7E:
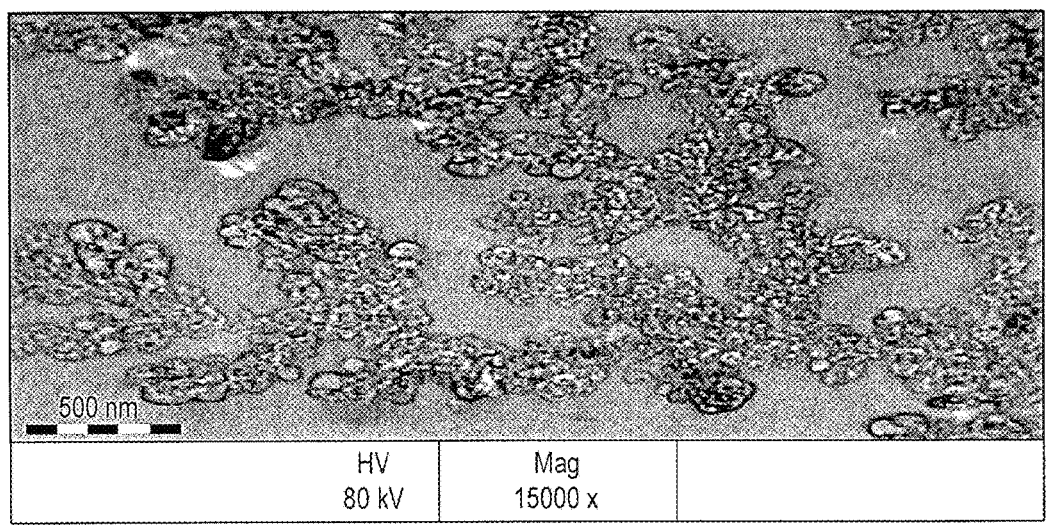
Figure 8A:
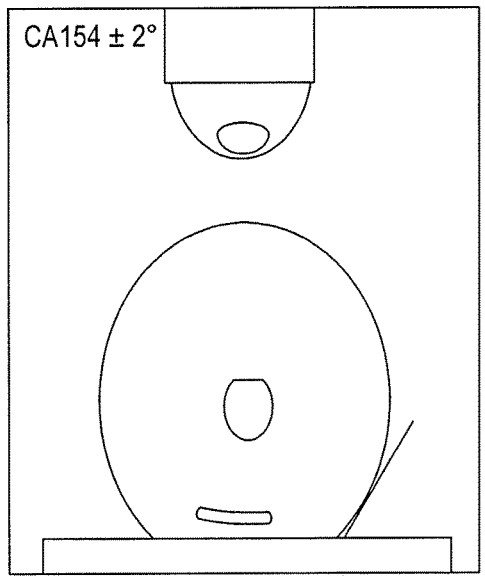
FIGS. 8A, 8B, 8C, and 8D are diagrams showing sample contact angles of water droplets with films formed from hydrophobic silica nanoparticles capped with wax prepared by method 3 at 25° C.
Figure 8B:
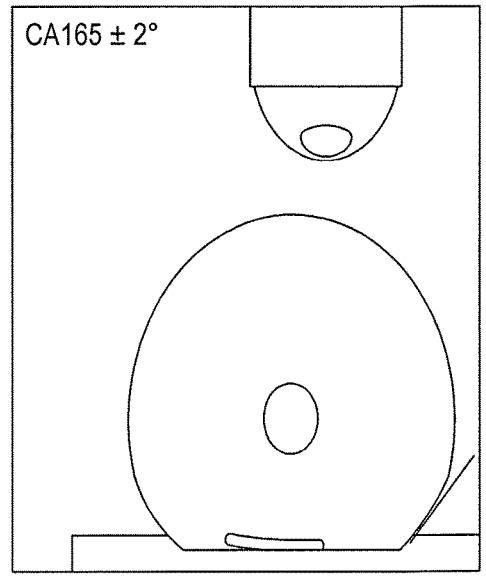
Figure 8C:
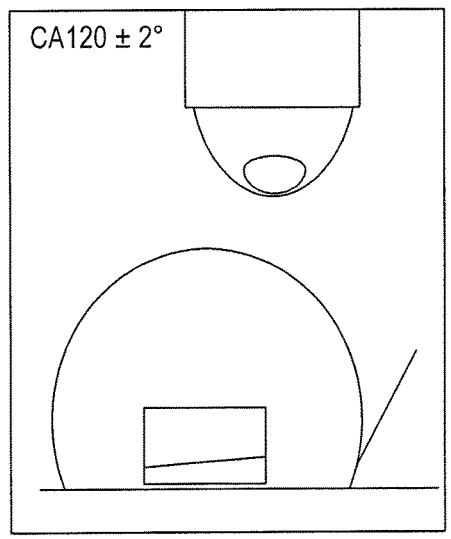
Figure 8D:
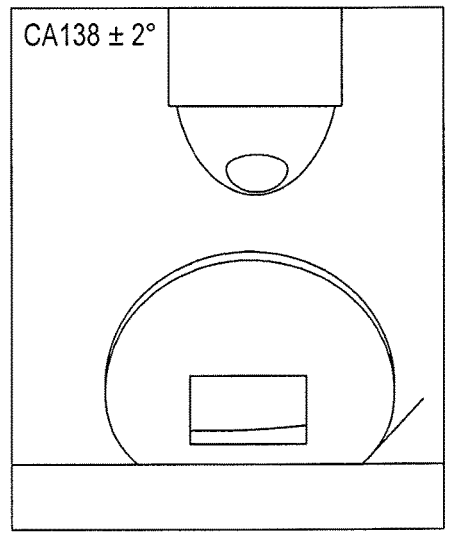

Thermal stability of the hydrophobic silica nanoparticles capped with wax significantly affects the potential for the nanoparticles to be useful in desired applications, such as coating sand for desert water storage. The thermal stability of the hydrophobic silica capped with wax was evaluated by thermogravimetric analysis (TGA), the resulting thermograms for nanoparticles formed by Methods 1-5 being shown in FIG. 6. Pure paraffin wax exhibits a typical one-step thermal degradation behavior between 180° C. and 270° C. Almost no char remains, indicating that paraffin wax experiences simple evaporation. The hydrophobic silica nanoparticles without wax (Method 1) also exhibit a marked one-step weight loss, beginning at approximately 300° C., and decompose entirely at around 470° C., presumably due to the presence of oleyl amide and amine in the chemical structures of SFA and SOA. The results shown in FIG. 6 indicate that sample hydrophobic silica nanoparticles capped with wax prepared according to Methods 2-5 exhibit a two-step degradation process. The first weight loss occurs between 320° C. and 350° C., likely related to the evaporation of paraffin wax. Subsequently, another weight loss occurs between 360° C. and 470° C., consistent with a hydrophobic oleyl shell decomposition. According to these results, the hydrophobic silica nanoparticles capped with wax have higher thermal stability when embedded with an organic-inorganic hybrid than those with a pure paraffin wax shell. Hypothetically, the wax-silica interface possesses excellent compatibility between organic and inorganic materials, so that the wax combines stably with the hydrophobic silica nanoparticles. On the other hand, TGA of the hydrophobic silica nanoparticles capped with wax prepared by Methods 2-5 exhibit a certain amount of residue, which is found to be correlated with the actual mass fraction of silica in the nanoparticles. This is likely because silicone does not decompose at 700° C., the maximum temperature tested.

The amount of silica nanoparticles in the samples can be calculated accurately from the TGA plots. The residual weights of paraffin wax and hydrophobic silica nanoparticles without paraffin wax are 0 and 69.1 wt. %, respectively. The remaining residues for hydrophobic silica nanoparticles capped with wax prepared by Methods 2-5 are 59.10, 45.38, 56.10, and 67.38 wt. %, respectively. These data show that adding hydrophobic silica nanoparticles to wax significantly influences the content of paraffin wax, SFA and SOA in the nanoparticles. Moreover, the thermal stability of wax increases significantly in the presence of the hydrophobic silica nanoparticles. In other words, the hydrophobic silica nanoparticles capped with wax form nanoparticles having a higher decomposition temperature.

The morphology of the prepared hydrophobic nanoparticles was determined by TEM micrographs, as represented in FIGS. 7A-7E. The micrographs confirm the DLS results and show that the silica nanoparticles act as cores to the nanoparticles, while the wax, SFA and SOA act as shells, as illustrated in FIG. 3. Moreover, Method 3 appears to produce more uniform and lower nanoparticle sizes.

The wetting of the hydrophobic silica nanoparticles capped with wax was evaluated by applying a thin film of the samples with thickness of 2 μm on glass panels and measuring the contact angle of water with the coated glass surfaces. The contact angle of the untreated glass surface with water was 45°, and the contact angle of water with the glass treated with the hydrophobic silica nanoparticles was determined and listed in Table 1. Hydrophobic silica nanoparticles were prepared with varying the amounts of paraffin wax ranging from 20 to 1 wt. %, and applied on the glass surface to determine their contact angles, reported in Table 2 and illustrated in FIGS. 8A-8D. The data listed in Table 1 confirm that the paraffin wax emulsion cannot form a hydrophobic surface on the glass and achieved a low contact angle (55°), presumably due to its low adhesion with the glass, with the formation of cracked film surfaces on the glass. Glass treated with each of the prepared hydrophobic silica nanoparticle samples show higher contact angles, especially the nanoparticles prepared using Method 3 in the presence of 5 wt. % of paraffin wax (Table 2 and FIG. 8) that achieved a contact angle of 165°. This result is possibly due to the lower particle sizes of the hydrophobic silica and their positive surface charges that are attracted to the negative surface charges of the silicate glass.

TABLE 1

Contact angle of water and hydrophobic silica/wax nanoparticle film-coated glass at 25° C.

| Sample | Contact angle (degrees) |
| --- | --- |
| Bare glass | 45° |
| Paraffin wax alone | 55° |
| Silica (Method 1) | 110° |
| Silica/wax (Method 2) | 120° |
| Silica/wax (Method 3) | 165° |
| Silica/wax (Method 4) | 118° |
| Silica/wax (Method 5) | 91° |

TABLE 2

Contact angle of water and hydrophobic silica nanoparticles capped with wax films prepared by method 3, at 25° C.

| Sample preparation method | Contact angle (degree) |
| --- | --- |
| Method 3 with wax content 20 wt. % | 120 |
| Method 3 with wax content 10 wt. % | 138 |
| Method 3 with wax content 5 wt. % | 165 |
| Method 3 with wax content 1 wt. % | 154 |

The superhydrophobicity of the sand mixtures, produced from blending treated sand silica with untreated sand, was evaluated from their low ability to pass water as reported in the experimental section. The times used to pass 10 mL of water through 2 g of untreated and mixed treated and untreated sand were recorded, as summarized in Table 3.

TABLE 3

Effect of admixture of treated sand with raw sand on flow of water through column of sand (water retention time in minutes)

| | Sand Composition (treated sand:untreated sand wt %) | | |
| --- | --- | --- | --- |
| Sample treatment | 1:10 | 1:5 | 1:1 |
| Blank (untreated sand) - 2 sec. | — | — | — |
| Silica/10 wt % paraffin wax | 11 | 15 | 17 |
| Silica/10 wt % paraffin wax | 17 | 19 | 25 |
| Paraffin wax emulsion - no silica | 1 | 2 | 3 |

The data in Table 3 indicates that paraffin wax emulsions alone cannot form superhydrophobic or hydrophobic sand compared with raw untreated sand. The water flows through untreated sand in about two seconds. Sand treated only with paraffin wax is only slightly better, flowing through mixtures of treated and untreated sand from 1:10 to 1:1 in one to three minutes. The treatment of sand with hydrophobic silica nanoparticles capped with wax, prepared by method 3, however, more efficiently modifies the hydrophobicity of sand to convert it to superhydrophobic sand, even when mixed with the untreated sand at ratios of 1:10 wt. %. Shifting surfaces and wetting of sand by constructing roughness structures and low-surface-energy modification is the key challenge for achieving superhydrophobicity with high water contact angle but low water adhesion. The present superhydrophobic silica nanoparticles capped with wax, used to treat sand, may present an opportunity for utilizing the abundant resource of sand in desert environments, as such treated sand produces results wherein water is not absorbed by the sand, but steadily stays above or rolls on the sand surface. Such superhydrophobic sand has great water-holding and low-flow-resistance capacities, which imply significant application value in desert water storage and transportation.

It is to be understood that the modification of sand with superhydrophobic silica/wax nanoparticles for desert water storage is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for modification of sand with superhydrophobic silica/wax nanoparticles, comprising the steps of:
    mixing sand with a solution of hydrophobic silica nanoparticles capped with wax to obtain modified hydrophobic sand;
    preparing a wax emulsion of 20.0 wt % paraffin wax in water with between 3.0 and 8.0 cetrimonium bromide (CTAB) surfactant;
    reacting at least one fatty acid with γ-aminopropyltriethoxysilane (APS) to obtain a silane alkoxy amide fatty acid (SOA);
    reacting at least one amine derivative of a fatty acid with vinyltrimethoxysilane to obtain a fatty amine of vinyltrimethoxysilane (SFA);
    sonicating methanol and the wax emulsion in a sonication bath for ten minutes;
    adding tetraethoxysilane (TEOS), the SOA, and the SFA to the sonication bath and sonicating for 20 minutes;
    adding ammonium hydroxide to the TEOS, the SOA, and the SFA in the sonication bath to promote a condensation reaction; and
    sonicating a further 60 minutes after adding the ammonium hydroxide to obtain the solution of hydrophobic silica nanoparticles capped with wax as a suspension.

2. The method for modification of sand according to claim 1, wherein said step of mixing comprises the step of stirring the sand in the solution of hydrophobic silica nanoparticles capped with wax for three hours.

3. The method for modification of sand according to claim 2, wherein said step of stirring the sand is performed at room temperature.

4. The method for modification of sand according to claim 1, further comprising the steps of:
    washing the modified hydrophobic sand in ethanol; and
    drying the modified hydrophobic sand at 60° C. for one hour.

5. The method for modification of sand according to claim 1, wherein said at least one fatty acid comprises oleic acid.

6. The method for modification of sand according to claim 1, wherein the fatty amine comprises oleyl amine.

7. The method for modification of sand according to claim 1, further comprising the steps of:
    mixing the wax emulsion with water while stirring for one hour;
    adding tetraethoxysilane (TEOS), the SOA, and the SFA to the wax emulsion mixed with water and stirring for 30 minutes;
    adding chloroform to the aqueous mixture of the wax emulsion, the TEOS, the SOA, and the SFA to emulsify the mixture;
    stirring the emulsified mixture for four hours;
    adding γ-aminopropyltriethoxysilane to the stirred, emulsified mixture to obtain a solution; and
    aging the solution overnight to obtain the solution of hydrophobic silica nanoparticles capped with wax.

8. The method for modification of sand according to claim 1, further comprising the step of mixing the modified hydrophobic sand with unmodified sand in a ration between 1:10 and 1:1 modified sand: unmodified sand by weight.

9. A method for modification of sand with superhydrophobic silica/wax nanoparticles, comprising the steps of:
    mixing sand with a solution of hydrophobic silica nanoparticles capped with wax to obtain modified hydrophobic sand;
    preparing a wax emulsion of 20.0 wt % paraffin wax in water with between 3.0 and 8.0 cetrimonium bromide (CTAB) surfactant;
    reacting at least one fatty acid with γ-aminopropyltriethoxysilane (APS) to obtain a silane alkoxy amide fatty acid (SOA);
    reacting at least one amine derivative of a fatty acid with vinyltrimethoxysilane to obtain a fatty amine of vinyltrimethoxysilane (SFA);
    dissolving the wax emulsion in water under stirring;
    adding concentrated ammonia water to the dissolved wax emulsion to obtain a clear solution; and
    adding a mixture of n-hexane, tetraethoxysilane (TEOS), the SOA, and the SFA dropwise into the clear solution while stirring at 200 rpm to obtain the solution of hydrophobic silica nanoparticles capped with wax as a colloidal solution.

10. A method for modification of sand with superhydrophobic silica/wax nanoparticles, comprising the steps of:
    mixing sand with a solution of hydrophobic silica nanoparticles capped with wax to obtain modified hydrophobic sand;
    preparing a wax emulsion of 20.0 wt % paraffin wax in water with between 3.0 and 8.0 cetrimonium bromide (CTAB) surfactant;
    reacting at least one fatty acid with γ-aminopropyltriethoxysilane (APS) to obtain a silane alkoxy amide fatty acid (SOA);
    reacting at least one amine derivative of a fatty acid with vinyltrimethoxysilane to obtain a fatty amine of vinyltrimethoxysilane (SFA);
    adding tetraethoxysilane (TEOS), the SOA, and the SFA to a solution of hydrochloric acid of pH 0.5 to obtain an acidic mixture;
    adding the wax emulsion to the acidic mixture with stirring to obtain a clear solution; and adding 14.7 M ammonia water to the clear solution and stirring for 24 hours to obtain the solution of hydrophobic silica nanoparticles capped with wax as a gel solution.

* * * * *